United States Patent Office 2,698,246
Patented Dec. 28, 1954

2,698,246

METHOD OF CONTROLLING SHRINKAGE IN IRISH POTATOES

Herman J. Keller, Dunedin, Fla., assignor to Clinton Foods Inc., New York, N. Y., a corporation of Delaware No Drawing. Application March 31, 1952,
Serial No. 279,685

4 Claims. (Cl. 99—154)

The present invention relates generally to the treatment of foodstuffs, and more particularly to a method of materially reducing the shrinkage in Irish potatoes, and the like, for periods of time.

There has long existed the problem of reducing shrinkage in Irish potatoes, and the like, between the time of removal from the ground and consumption. Since Irish potatoes, and the like, are sold by the pound, it is commercially desirable from the standpoint of the grower and others handling the potatoes, through and including the retailer, for the product to retain substantially its original weight throughout the handling. Additionally, the consumer is able to purchase a potato having substantially the normal liquid content when shrinkage is reduced to a minimum. Where shrinkage is severe, the potatoes become unsalable from appearance alone, resulting in an economic loss.

Briefly, the present invention comprises subjecting the potatoes, and the like, to an atmosphere containing a predetermined amount of gaseous material which contacts the potatoes and materially reduces shrinkage for a period of time. The potatoes are subjected to the gaseous atmosphere, preferably in a closed area, for a predetermined period of time, which may be twenty-four hours. An admixture of substantially two parts ethylene dichloride and one part trichloroethane in predetermined amount is a preferred material, which normally is introduced into the presence of the potatoes as a liquid and permitted to evaporate.

Therefore, an object of the present invention is to provide a novel method of reducing shrinkage in Irish potatoes, and the like, an appreciable amount.

Another object is to provide a novel method of materially reducing shrinkage in Irish potatoes, and the like, which effectively accomplishes the objective without damage to the potatoes and without harmful effects on human beings.

Another object is to provide a novel method of maintaining Irish potatoes, and the like, against material loss of weight to reduce the economic loss normally occasioned thereby during handling, and to insure a salable product throughout the handling period.

Other objects are to provide a novel method of substantially reducing the shrinkage in Irish potatoes, and the like, which is simple in its application, which is inexpensive, and which is highly successful for its intended purpose.

The foregoing and other objects and advantages are apparent from the following description.

The present method of materially reducing the shrinkage in Irish potatoes, and the like, is exceedingly simple. The potatoes, and the like, are subjected to an atmosphere containing a predetermined amount of gaseous admixture of substantially two parts ethylene dichloride and one part trichloroethane for a predetermined period of time, preferably in a closed area.

Preferably, the admixture is applied as a liquid and permitted to evaporate so that the gases completely blanket the potatoes, and the like. The blanketing effect is maintained in a closed area for a period of substantially twenty-four hours, although a lesser period may be employed under some circumstances.

Numerous tests under various circumstances have developed that the optimum results are obtainable from substantially one and a half to two and a half cubic centimeters of the above-mentioned admixture to a six-gallon container, which amounts to substantially seven to eight ounces per one hundred cubic feet of space, or substantially four and a half to five and a half quarts per standard train carload of Irish potatoes, all quantities being liquid measurement.

Numerous tests have been conducted in the laboratory in the application of the present invention. In late August and early September of 1951 at Alamosa, Colorado, typical tests with typical results were conducted at room temperature and humidity, the weather being somewhat warm and humid. In each instance, fifteen (15) pounds of unwashed Irish potatoes dug from the ground the day of the test were placed in six-gallon sealed containers, the treated lot with two cubic centimeters of the above-identified admixture, and maintained therein for twenty-four hours. The potatoes in each case were then removed to an open container for observation and weighing. The following results obtained:

*Test No. 1.—Unwashed red Irish potatoes*

| | | |
|---|---|---|
| Treated Lot | 4 days, 0.0% | 7 days, 5.0%. |
| Untreated Lot | 4 days, 5.0% | 7 days, 15.4%. |

*Test No. 2.—Unwashed white Irish potatoes*

| | | |
|---|---|---|
| Treated Lot | 6 days, 4.2% | 10 days, 4.4%. |
| Untreated Lot | 6 days, 15.3% | 10 days, 15.3%. |

*Test No. 3.—Unwashed white Irish potatoes*

| | | |
|---|---|---|
| Treated Lot | 5 days, 3.5% | 9 days, 3.5%. |
| Untreated Lot | 5 days, 7.1% | 9 days, 10.7%. |

The percentages above indicate shrinkage in weight.

In another test run, red McClure Irish potatoes were dug from the ground on September 12, 1951, and test and check lots of fifteen (15) pounds each immediately placed in six-gallon cans, the treated lot along with two cubic centimeters of the above-identified admixture, the cans were sealed, were maintained sealed for twenty-four hours at an average temperature of around seventy degrees Fahrenheit, and were then opened, the location being the same as that of the above enumerated tests. The following results obtained, the percentages being shrinkage in weight:

| | | |
|---|---|---|
| Treated Lot | 5 days, 3.3% | 10 days, 4.0%. |
| Untreated Lot | 5 days, 5.0% | 10 days, 10.2%. |

Tests have been conducted to determine the optimum amount of treating liquid to be vaporized. On September 14, 1951, red McClure Irish potatoes were removed from the field and fifteen (15) pounds placed in each of six separate containers and sealed for twenty-four hours, an amount of the above-identified admixture indicated in the table below being placed in five containers in liquid form. After twenty-four hours, all containers were opened and the six lots of potatoes were placed in open containers and held for seven days from the start of the test in cold storage at temperatures between thirty-five–forty degrees Fahrenheit. At the end of this period, no shrinkage in weight was noted in any of the six lots of potatoes, including the five treated lots and the check (no treatment) lot. The six lots of potatoes were then removed and placed in a warehouse at ambient temperatures (Alamosa, Colorado) where they were left for an additional four days with the following results:

| | Weight Shrinkage | Weight Shrinkage, Percent |
|---|---|---|
| Lot A, 1 cc. SDPS 4 (11) days | 2.5% 9 (16) days | 3.3 |
| Lot B, 1½ cc. SDPS 4 (11) days | 0.4% 9 (16) days | 0.8 |
| Lot C, 2 cc. SDPS 4 (11) days | 0.0% 9 (16) days | 0.4 |
| Lot D, 2½ cc. SDPS 4 (11) days | 0.0% 9 (16) days | 0.4 |
| Lot E, 3 cc. SDPS 4 (11) days | 2.2% 9 (16) days | 5.5 |
| Lot F, No treatment 4 (11) days | 5.0% 9 (16) days | 7.8 |

This test was conducted to simulate shipment of fresh potatoes in refrigerated cars or trucks and the period after removal. This test is typical of numerous tests conducted along the same lines.

In commercial experiments, five quarts of the above-identified admixture, liquid measurement, are introduced into a carload of Irish potatoes and permitted to evaporate, the car being maintained closed for twenty-four hours in the same manner as the containers in the above-mentioned laboratory experiments. Refrigerated cars are maintained closed, but normally standard boxcars are opened to outside temperatures after the gassing period of twenty-four hours. Selected sacks, and the like, of potatoes weighed before and after treatment as a part of carload shipments show the same material reduction in shrinkage as indicated in the laboratory test.

Apparently, the present treatment results in an accelerated "corkiness" of the skin of the potato, and the like, or other sealing effect, so that for a length of time moisture cannot rapidly evaporate from the potato. There is no injury to the reproduction system of the potatoes, since potatoes used in experiments have sprouted along with the check potatoes.

The tests set forth above and other tests clearly show that moisture evaporation from potatoes is markedly arrested or decreased for about ten (10) days, whether released directly to ambient temperatures after treatment or held in cold storage and then released when subjected to an atmosphere of the above-mentioned admixture as described. Re-gassing prolongs the decreased loss period substantially another ten (10) days tests show. Other gases may be employed in the present novel method.

It is apparent that the present novel method fulfills the objects and advantages sought therefor.

It is to be understood that the foregoing description has been given by way of illustration and example. It is also to be understood that substitution of equivalent steps and rearrangement of steps, which will be readily apparent to one skilled in the art, are contemplated as within the scope of the present invention which is limited only by the claims which follow.

What is claimed is:

1. A method of materially reducing the shrinkage in Irish potatoes for a period of time, comprising the step of subjecting the potatoes, for a period of time, to an atmosphere containing an admixture of ethylene dichloride and trichloroethane in a ratio of about two parts of the former to about one part of the latter, both by weight in the liquid form.

2. A method of materially reducing the shrinkage in Irish potatoes for a period of time, comprising the step of subjecting the potatoes, for a period of time, to an atmosphere containing an admixture of ethylene dichloride and trichloroethane in a ratio of two parts of the former to one part of the latter, both by weight in the liquid form, and in a concentration substantially equal to eight cubic centimeters of liquid admixture per one hundred cubic feet of free space surrounding the potatoes.

3. A method of materially reducing the shrinkage in Irish potatoes for a period of time, comprising the step of subjecting the potatoes, for at least substantially twenty-four hours to an atmosphere containing an admixture of ethylene dichloride and trichloroethane in a ratio of two parts of the former to one part of the latter, both by weight in the liquid form, and in a concentration substantially equal to eight cubic centimeters of liquid admixture per one hundred cubic feet of free space surrounding the potatoes.

4. A method of materially reducing the shrinkage in Irish potatoes for a period of time, comprising the step of subjecting the potatoes for at least substantially twenty-four hours in a substantially closed area, to an atmosphere containing an admixture of ethylene dichloride and trichloroethane in a ratio of two parts of the former to one part of the latter, both by weight in the liquid form, and in a concentration substantially equal to eight cubic centimeters of liquid admixture per one hundred cubic feet of free space surrounding the potatoes.

References Cited in the file of this patent

UNITED STATES PATENTS

| Number | Name | Date |
|---|---|---|
| 2,604,408 | Marks et al. | July 22, 1952 |